(12) United States Patent
Yun

(10) Patent No.: US 9,401,616 B2
(45) Date of Patent: Jul. 26, 2016

(54) BATTERY PACK, ENERGY STORAGE SYSTEM INCLUDING BATTERY PACK, AND METHOD OF CHARGING BATTERY PACK

(71) Applicant: SAMSUNG SDI CO., LTD., Yongin-si, Gyeonggi-do (KR)

(72) Inventor: Han-Seok Yun, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 184 days.

(21) Appl. No.: 14/188,627

(22) Filed: Feb. 24, 2014

(65) Prior Publication Data

US 2015/0108950 A1    Apr. 23, 2015

(30) Foreign Application Priority Data

Oct. 22, 2013   (KR) .................. 10-2013-0126104

(51) Int. Cl.
*H02J 7/00*    (2006.01)
*H01M 10/46*    (2006.01)
*H01M 2/10*    (2006.01)
*H01M 10/44*    (2006.01)
*H01M 10/42*    (2006.01)

(52) U.S. Cl.
CPC ........... *H02J 7/0068* (2013.01); *H01M 10/443* (2013.01); *H01M 10/46* (2013.01); *H02J 7/00* (2013.01); *H02J 7/0077* (2013.01); *H02J 7/0091* (2013.01); *H01M 2/1016* (2013.01); *H01M 10/441* (2013.01); *H01M 2010/4271* (2013.01); *H01M 2010/4278* (2013.01); *H02J 7/007* (2013.01)

(58) Field of Classification Search
None
See application file for complete search history.

(56) References Cited

U.S. PATENT DOCUMENTS

| 5,592,069 | A | 1/1997 | Dias et al. |
| 5,804,944 | A | 9/1998 | Alberkrack et al. |
| 6,859,015 | B1 * | 2/2005 | Fazakas ............... H02J 7/0077 320/150 |
| 7,633,268 | B2 * | 12/2009 | Sakaue ................ H01M 10/46 320/150 |

(Continued)

FOREIGN PATENT DOCUMENTS

| EP | 1 826 863 A2 | 8/2007 |
| EP | 2 405 525 A2 | 1/2012 |

(Continued)

OTHER PUBLICATIONS

EPO Search Report dated Mar. 6, 2015, for corresponding European Patent application 14162750.5, (8 pages).

*Primary Examiner* — Leigh Garbowski
(74) *Attorney, Agent, or Firm* — Lewis Roca Rothgerber Christie LLP

(57) ABSTRACT

A battery pack including: a battery including a battery cell; a temperature sensor for detecting a temperature of the battery; a cell voltage measuring unit for measuring a cell voltage of the battery cell and generating cell voltage data including a cell voltage value; a temperature measuring unit coupled to the temperature sensor, the temperature measuring unit being for generating temperature data including a temperature value corresponding to the temperature of the battery detected by the temperature sensor; and a control unit for determining a maximum charging current value (MCCV) of a charging current for charging the battery based on the cell voltage data and the temperature data. The control unit is for transmitting the MCCV to a charging apparatus for supplying the charging current to the battery pack. The charging apparatus is for controlling the charging current supplied to the battery pack to have a value below the MCCV.

8 Claims, 10 Drawing Sheets

(56) References Cited

U.S. PATENT DOCUMENTS

| | | | | |
|---|---|---|---|---|
| 8,004,239 B2* | 8/2011 | Kawahara | ............ | B60L 11/1864 320/128 |
| 8,217,628 B2* | 7/2012 | Yang | ..................... | H02J 7/0031 320/134 |
| 8,742,762 B2* | 6/2014 | Henkel | ................. | H02J 7/0091 320/150 |
| 9,013,140 B2* | 4/2015 | Mack | ................... | H01M 10/425 320/107 |
| 9,231,418 B2* | 1/2016 | Kluthe | ................... | H01M 10/44 |
| 2009/0295334 A1 | 12/2009 | Yang et al. | | |
| 2011/0012563 A1* | 1/2011 | Paryani | ............. | H01M 10/0525 320/162 |
| 2011/0109273 A1* | 5/2011 | Tamezane | ............ | H02J 7/0077 320/132 |
| 2012/0025786 A1* | 2/2012 | Heizer | ................... | H02J 7/0077 320/160 |
| 2012/0112706 A1 | 5/2012 | Henkel et al. | | |
| 2012/0229078 A1 | 9/2012 | Mack et al. | | |
| 2013/0207464 A1* | 8/2013 | Kluthe | ................... | H01M 10/44 307/10.7 |
| 2014/0370940 A1* | 12/2014 | Yoshida | .............. | H01M 10/425 455/572 |
| 2015/0035495 A1 | 2/2015 | Yoshida | | |

FOREIGN PATENT DOCUMENTS

| | | | |
|---|---|---|---|
| JP | 2013/000708 | * | 2/2013 |
| KR | 2001-0006107 | | 1/2001 |
| KR | 10-2001-0019941 | | 3/2001 |
| KR | 10-1042768 | | 6/2011 |
| WO | WO 2011/088450 A2 | | 7/2011 |
| WO | WO 2013/128809 A1 | | 9/2013 |

* cited by examiner

FIG. 5A

| minCV condition | minT condition | MCCV |
|---|---|---|
| [Initial minCV] | [Initial minT] | [A] |
| minCV < CV1 | – | 0 |
| CV1 ≤ minCV < CV2 | minT < T1 | 0 |
| | T1 ≤ minT | MCCV1a (MCCV2a) |
| CV2 ≤ minCV | minT < T1 | 0 |
| | T1 ≤ minT < T2 | MCCV2a |
| | T2 ≤ minT < T3 | MCCV2b |
| | T3 ≤ minT < T4 | MCCV2c |
| | T4 ≤ minT | MCCV1b (MCCV2d) |

FIG. 5B

| minCV condition | | minT condition | | MCCV |
|---|---|---|---|---|
| [Decreasing minCV] | [Increasing minCV] | [Decreasing minT] | [Increasing minT] | |
| minCV < CV1 | - | - | - | [A] |
| CV1 ≤ minCV < CV2 | CV1' ≤ minCV < CV2' | minT < T1 | - | 0 |
| | | - | - | 0 |
| | | - | T1' ≤ minT | MCCV1a (MCCV2a) |
| CV2' ≤ minCV | | minT < T1 | - | 0 |
| | | T1 ≤ minT < T2 | T1' ≤ minT < T2' | MCCV2a |
| | | T2 ≤ minT < T3 | T2' ≤ minT < T3' | MCCV2b |
| | | T3 ≤ minT < T4 | T3' ≤ minT < T4' | MCCV2c |
| - | | - | T4' ≤ minT | MCCV1b (MCCV2d) |

FIG. 5C

| minCV condition | | minT condition | | MCCV |
|---|---|---|---|---|
| [Decreasing minCV] | [Increasing minCV] | [Decreasing minT] | [Increasing minT] | [A] |
| minCV < CV1 & tp sec | | – | – | 0 |
| CV1 ≤ minCV< CV2 & tp sec | | – | – | 0 |
| | CV1' ≤ minCV< CV2' & tp sec | – | – | 0 |
| | | minT < T1 & tp sec | T1' ≤ minT & tp sec | MCCV1a (MCCV2a) |
| | CV2' ≤ minCV & tp sec | minT < T1 & tp sec | – | 0 |
| | | T1 ≤ minT< T2 & tp sec | T1' ≤ minT< T2' & tp sec | MCCV2a |
| | | T2 ≤ minT< T3 & tp sec | T2' ≤ minT< T3' & tp sec | MCCV2b |
| | | T3 ≤ minT< T4 & tp sec | T3' ≤ minT< T4' & tp sec | MCCV2c |
| – | | | T4' ≤ minT & tp sec | MCCV1b (MCCV2d) |

BATTERY PACK, ENERGY STORAGE SYSTEM INCLUDING BATTERY PACK, AND METHOD OF CHARGING BATTERY PACK

CROSS-REFERENCE TO RELATED APPLICATION

This application claims priority to and the benefit of Korean Patent Application No. 10-2013-0126104, filed on Oct. 22, 2013, in the Korean Intellectual Property Office, the disclosure of which is incorporated herein in its entirety by reference.

BACKGROUND

1. Field

One or more embodiments of the present invention relate to a battery pack, an energy storage system including the battery pack, and a method of charging the battery pack.

2. Related Art

Secondary batteries are rechargeable batteries, unlike primary batteries that are not rechargeable. Methods of charging secondary batteries using a constant voltage or a constant current are well known. However, when secondary batteries are charged without considering their states, problems may occur; for example, capacities of secondary batteries may rapidly deteriorate.

SUMMARY

One or more embodiments of the present invention include a battery pack that may be charged in consideration of a state of a secondary battery and an energy storage system including the battery pack.

One or more embodiments of the present invention include a method of charging a battery pack in consideration of a state of a secondary battery.

According to one or more embodiments of the present invention, a battery pack includes: a battery including at least one battery cell; at least one temperature sensor configured to detect a temperature of the battery; a cell voltage measuring unit configured to measure a cell voltage of the at least one battery cell and to generate cell voltage data including at least one cell voltage value; a temperature measuring unit coupled to the at least one temperature sensor, the temperature measuring unit being configured to generate temperature data including at least one temperature value corresponding to the temperature of the battery detected by the at least one temperature sensor; and a control unit configured to determine a maximum charging current value (MCCV) of a charging current for charging the battery based on the cell voltage data and the temperature data. Here, the control unit is configured to transmit the MCCV to a charging apparatus configured to supply the charging current to the battery pack, and the charging apparatus is configured to control the charging current supplied to the battery pack to have a value below the MCCV.

The control unit may be configured to determine a first MCCV based on the at least one cell voltage value, and to determine the MCCV based on the first MCCV.

The control unit may be configured to: determine a minimum cell voltage value among the at least one cell voltage value; and determine the first MCCV based on the minimum cell voltage value according to first relationship data defining a correlation between the first MCCV and the minimum cell voltage value.

The control unit may be configured to: determine a first value as the first MCCV when the minimum cell voltage value is smaller than a first cell voltage threshold value; determine a second value greater than the first value as the first MCCV when the minimum cell voltage value is greater than a second cell voltage threshold value, which is greater than the first cell voltage threshold value by a hysteresis margin; and determine one of the first value or the second value as the first MCCV according to whether the minimum cell voltage value is increasing or decreasing when the minimum cell voltage value is greater than the first cell voltage threshold value and smaller than the second cell voltage threshold value.

The control unit may be configured to: determine a first value as the first MCCV when the minimum cell voltage value is smaller than a first cell voltage threshold value for a preset time period; determine a second value greater than the first value as the first MCCV when the minimum cell voltage value is greater than a second cell voltage threshold value, which is greater than the first cell voltage threshold value by a hysteresis margin, for the preset time period; and determine one of the first value or the second value as the first MCCV according to whether the minimum cell voltage value is increasing or decreasing when the minimum cell voltage value is greater than the first cell voltage threshold value and smaller than the second cell voltage threshold value for the preset time period.

The control unit may be configured to: determine a second MCCV based on the at least one temperature value; and determine the MCCV based on the second MCCV.

The control unit may be configured to: determine a minimum temperature value among the at least one temperature value; and determine the second MCCV based on the minimum temperature value according to second relationship data defining a correlation between the second MCCV and the minimum temperature value.

The control unit may be configured to: determine a first value as the second MCCV when the minimum temperature value is smaller than a first temperature threshold value; determine a second value greater than the first value as the second MCCV when the minimum temperature value is greater than a second temperature threshold value, which is greater than the first temperature threshold value by a hysteresis margin; and determine one of the first value or the second value as the second MCCV according to whether the minimum temperature value is increasing or decreasing when the minimum temperature value is greater than the first temperature threshold value and smaller than the second temperature threshold value.

The control unit may be configured to: determine a first value as the second MCCV when the minimum temperature value is smaller than a first temperature threshold value for a preset time period; determine a second value greater than the first value as the second MCCV when the minimum temperature value is greater than a second temperature threshold value, which is greater than the first temperature threshold value by a hysteresis margin, for the preset time period; and determine one of the first value or the second value as the second MCCV according to whether the minimum temperature value is increasing or decreasing when the minimum temperature value is greater than the first temperature threshold value and smaller than the second temperature threshold value for the preset time period.

The control unit may be configured to determine a first MCCV based on the at least one cell voltage value, to determine a second MCCV based on the at least one temperature value, and to determine a smaller one between the first MCCV and the second MCCV as the MCCV.

According to one or more embodiments of the present invention, there is provided an energy storage system including: a battery system including a battery including at least one battery cell and a battery management unit configured to control charging and discharging of the battery; and a power conversion system (PCS) including a power converting apparatus configured to convert power between a power generation system, a grid, and the battery system and an integrated controller configured to control the power converting apparatus. The battery management unit includes: a cell voltage measuring unit configured to measure a cell voltage of the at least one battery cell and to generate cell voltage data including at least one cell voltage value; a temperature measuring unit configured to generate temperature data including at least one temperature value corresponding to a temperature of the battery detected by at least one temperature sensor in the battery; and a control unit configured to determine a maximum charging current value (MCCV) of a charging current for charging the battery based on the cell voltage data and the temperature data and to transmit the MCCV to the integrated controller. The integrated controller is configured to receive the MCCV from the battery management unit and control the power converting apparatus to supply the charging current having a value below the MCCV to the battery system.

The control unit may be configured to determine a first MCCV based on the at least one cell voltage value, to determine a second MCCV based on the at least one temperature value, and to determine a smaller one between the first MCCV and the second MCCV as the MCCV.

The control unit may be configured to: determine a minimum cell voltage value among the at least one cell voltage value; and determine the first MCCV based on the minimum cell voltage value according to first relationship data defining a correlation between the first MCCV and the minimum cell voltage value.

The control unit may be configured to: determine a minimum temperature value among the at least one temperature value; and determine the second MCCV based on the minimum temperature value according to second relationship data defining a correlation between the second MCCV and the minimum temperature value.

According to one or more embodiments of the present invention, there is provided a method of charging a battery pack including a battery including at least one battery cell, the method including: measuring a cell voltage of the at least one battery cell; generating cell voltage data including at least one cell voltage value corresponding to the cell voltage; generating temperature data including at least one temperature value corresponding to a temperature of the battery measured by at least one temperature sensor; determining a maximum charging current value (MCCV) of a charging current for charging the battery based on the cell voltage data and the temperature data; transmitting the MCCV to a charging apparatus coupled to the battery pack; and supplying the charging current having a value below the MCCV from the charging apparatus.

The determining of the MCCV may include: determining a first MCCV based on the at least one cell voltage value; determining a second MCCV based on the at least one temperature value; and determining a smaller one between the first MCCV and the second MCCV as the MCCV.

BRIEF DESCRIPTION OF THE DRAWINGS

The accompanying drawings illustrate embodiments of the present invention, and together with the specification, serve to explain features and aspects of the present invention.

FIGS. 5A through 5C are exemplary tables of MCCVs with respect to a cell voltage and a temperature based on the graphs of FIGS. 4A and 4B.

DETAILED DESCRIPTION

Figure 1:
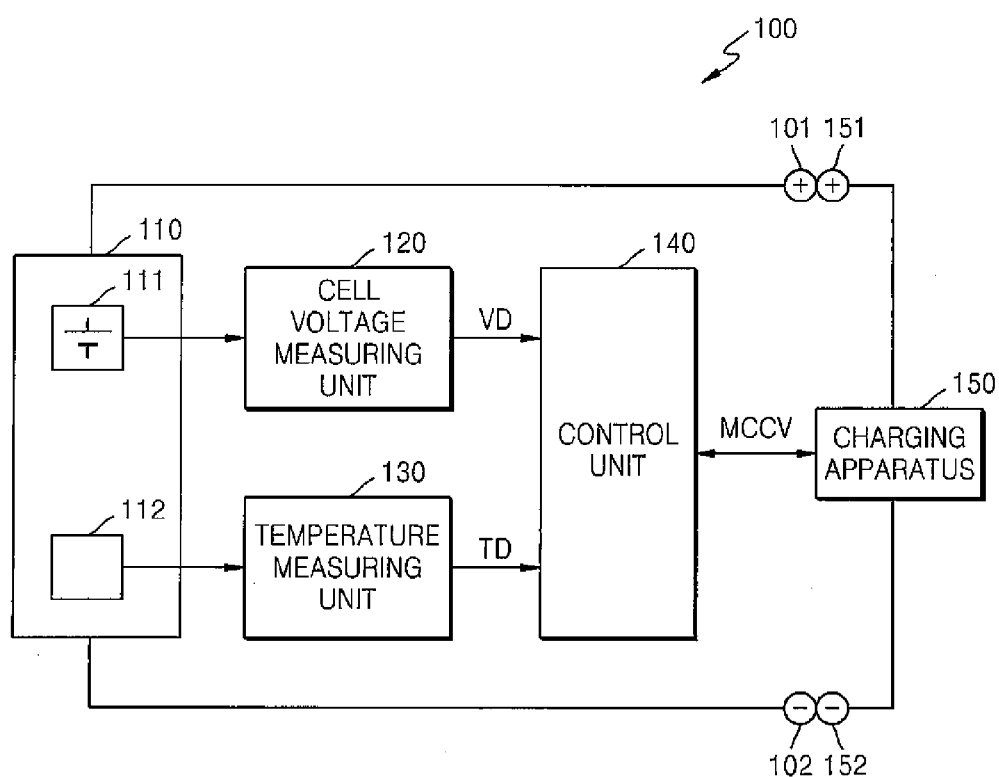
FIG. 1 is a schematic block diagram of a battery pack according to an embodiment of the present invention.

The aspects and features of the present invention and methods of achieving them will be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be thorough and complete, and will fully convey the concept of the invention to one of ordinary skill in the art. The scope of the invention is defined by the appended claims and their equivalents.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. It will be understood that, although the terms "first", "second", etc. may be used herein to describe various elements, these elements should not be limited by these terms. These terms are only used to distinguish one element from another.

In the drawings, the same or corresponding elements are denoted by the same reference numerals, and a repeated explanation thereof will not be given. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

FIG. 1 is a schematic block diagram of a battery pack 100 according to an embodiment of the present invention.

Referring to FIG. 1, the battery pack 100 includes a battery 110, a temperature sensor 112, a cell voltage measuring unit 120, a temperature measuring unit 130, and a control unit 140. The battery 110 includes at least one battery cell 111. The battery pack 100 includes at least one temperature sensor 112 that detects a temperature of the battery 110. The cell voltage measuring unit 120 measures a cell voltage of the battery cell 111 and generates cell voltage data VD including at least one cell voltage value. The temperature measuring unit 130 generates temperature data TD including at least one temperature value corresponding to the temperature of the battery 110 from the temperature sensor 112. The control unit 140 is configured to determine a maximum charging current value (MCCV) of current flowing into the battery 110 based on the cell voltage data VD and the temperature data TD.

The battery 110 stores energy and includes the battery cell 111. Although one battery cell 111 is illustrated in the battery 110 in FIG. 1, a plurality of battery cells 111 may be included in the battery 110.

The battery 110 including the plurality of battery cells 111 will now be described below. The plurality of battery cells 111 may be connected in series, in parallel, or in series-parallel. The number of the battery cells 111 included in the battery 110 may be determined according to a required output voltage or power.

The battery 110 may be connected to a charging apparatus 150 via terminals 101 and 102. The terminals 101 and 102 of the battery pack 100 may respectively be connected to terminals 151 and 152 of the charging apparatus 150. The battery 110 stores electric energy supplied from the charging apparatus 150 via the terminals 101 and 102 when the battery 110 is charged. During the charging of the battery 110, charging current flows from the charging apparatus 150 to the battery 110. When, for example, the battery 110 is over-discharged, is exposed to a low temperature environment, or if a high charging current flows into the battery 110, the battery 110 may be damaged. For example, the battery 110 may rapidly deteriorate.

The battery 110 may be connected to a load via the terminals 101 and 102, and, when the battery 110 is discharged, it supplies electric energy to the load via the terminals 101 and 102.

The battery cell 111 may include a rechargeable secondary battery. For example, the battery cell 111 may include a nickel-cadmium battery, a lead storage battery, a nickel metal hydride (NiMH) battery, a lithium-ion battery, a lithium polymer battery, etc.

Although one battery 110 is shown in the battery pack 100 illustrated in FIG. 1, a plurality of batteries 110 may be included in the battery pack 100. In this case, the plurality of batteries 110 may be connected in series, in parallel, or in series-parallel. The battery pack 100 may have a master-slave structure and may include a plurality of slave control units that control the batteries 110, and a master control unit that generally controls the batteries 110. The slave control units may generate and transmit cell voltage data and temperature data of the corresponding batteries 110 to the master control unit. The master control unit may determine a MCCV of the battery pack 100 based on the cell voltage data and the temperature data.

The cell voltage measuring unit 120 is configured to measure cell voltages of the battery cells 111 and generate (or determine) the cell voltage data VD including a plurality of cell voltage values. The cell voltage measuring unit 120 may be connected to nodes between the battery cells 111 and include an analog-to-digital converter (ADC) that converts voltages between the nodes into digital cell voltage values. The digital cell voltage values may respectively correspond to the battery cells 111 and may be collectively referred to as the cell voltage data VD. The cell voltage measuring unit 120 may be realized as an analog front end (AFE).

The temperature sensor 112 may be disposed in the battery 110 to detect the temperature of the battery 110. Although one temperature sensor 112 is shown in the battery pack 100 illustrated in FIG. 1, a plurality of temperature sensors 112 may be included in the battery pack 100. The battery pack 100 including the plurality of temperature sensors 112 will now be described below.

The temperature sensors 112 may be disposed adjacent to the battery cells 111 included in the battery 110 to detect temperatures of the battery cells 111. For example, the temperature sensors 112 may be mounted on a bus bar used to connect the battery cells 111. The number of the temperature sensors 112 may be the same as that of the battery cells 111. The number of the temperature sensors 112 may be greater or smaller than that of the battery cells 111.

The temperature measuring unit 130 is configured to be electrically connected to the temperature sensors 112, to detect the temperatures of the battery cells 111 from the temperature sensors 112, and to generate (or determine) the temperature data TD including a plurality of temperature values respectively corresponding to the temperatures of the battery cells 111.

The temperature sensors 112 may include thermistors having resistance values variable with respect to a peripheral temperature. The temperature measuring unit 130 generates the temperature values based on the resistance values of the temperature sensors 112. The temperature measuring unit 130 may include circuits used to measure the resistance values of the temperature sensors 112. The temperature measuring unit 130 may include an ADC that converts a measured analog value into a digital value. The temperature values may respectively correspond to the temperature sensors 112 and may be collectively referred to as the temperature data TD.

As an example, the temperature sensors 112 may include thermistors having negative temperature coefficients whose resistance values are smaller as the peripheral temperature increases. As another example, the temperature sensors 112 may include thermistors having positive temperature coefficients whose resistance values are greater as the peripheral temperature increases.

The control unit 140 receives the cell voltage data VD from the cell voltage measuring unit 120 and receives the temperature data TD from the temperature measuring unit 130. The control unit 140 determines the MCCV of the current supplied to the battery 110 to charge the battery 110 based on the cell voltage data VD and the temperature data TD. The control unit 140 may transmit the MCCV to the charging apparatus 150, and may control a value of current supplied to the battery pack 100 to be below the MCCV. The current having the value below the MCCV may be supplied from the charging apparatus 150 to the battery 110, thereby resolving an issue of deterioration of the battery 110 due to an overcurrent that is not proper in regard to a state of the battery 110.

As an example, the control unit 140 may determine a first MCCV based on the cell voltage data VD and a second MCCV based on the temperature data TD. The control unit 140 may determine a smaller one between the first MCCV and the second MCCV as the MCCV.

The control unit 140 may be realized as a micro control unit (MCU).

Figure 2:
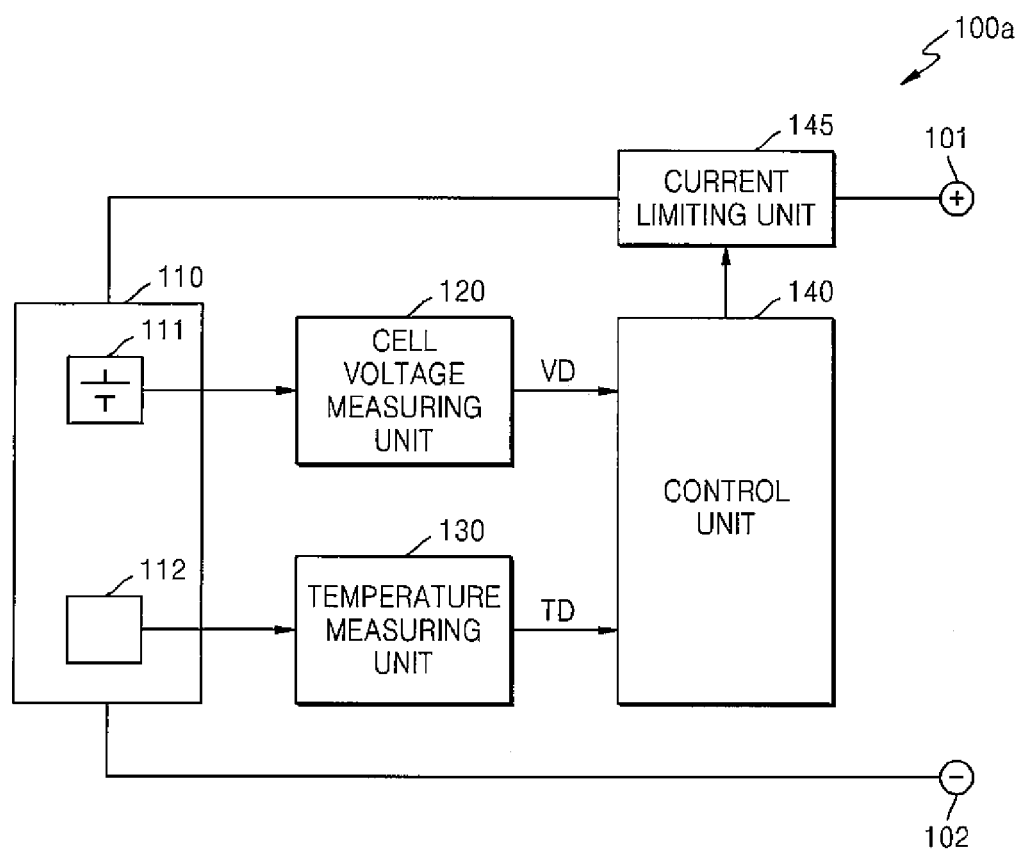
FIG. 2 is a schematic block diagram of a battery pack according to another embodiment of the present invention.

FIG. 2 is a schematic block diagram of a battery pack 100a according to another embodiment of the present invention.

Referring to FIG. 2, the battery pack 100a includes the battery 110, the temperature sensor 112, the cell voltage measuring unit 120, the temperature measuring unit 130, the control unit 140, and a current limiting unit 145. The battery 110, the temperature sensor 112, the cell voltage measuring unit 120, the temperature measuring unit 130, and the control unit 140 are described above with reference to FIG. 1 above, and thus, redundant descriptions thereof are not provided.

The current limiting unit 145 may limit charging current supplied from a charging apparatus that is connected to the battery pack 100a. The control unit 140 may determine a MCCV of current flowing into the battery 110 based on the cell voltage data VD and the temperature data TD and control the current limiting unit 145 based on the MCCV. Although the charging apparatus may supply current having a value greater than the MCCV to the battery pack 100a, the current limiting unit 145 restricts the current to have a value at or below the MCCV according to the control of the control unit 140, and thus, the battery pack 100a may be charged with a desired (or appropriate) charging current.

Figure 3A:
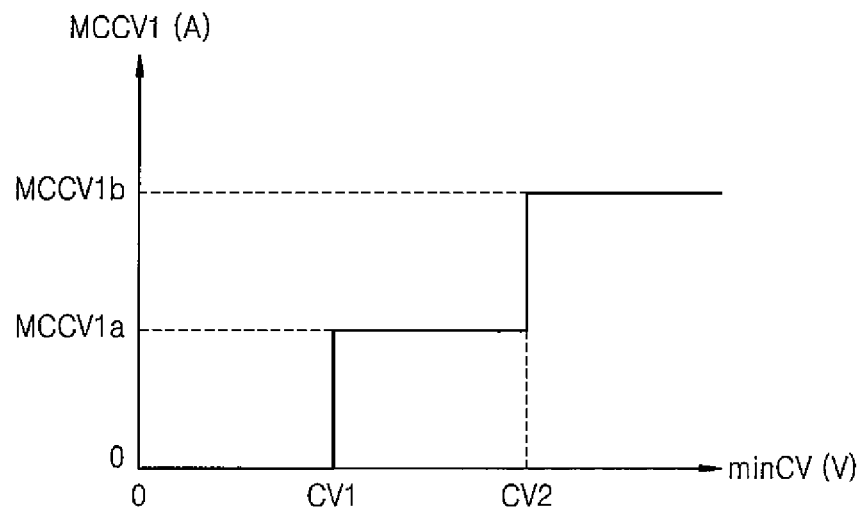
FIG. 3A is an exemplary graph of a maximum charging current value (MCCV) with respect to a cell voltage according to an embodiment of the present invention.

FIG. 3A is an exemplary graph of a MCCV with respect to a cell voltage according to an embodiment of the present invention.

Referring to FIG. 3A, the control unit 140 may determine a first MCCV MCCV1 based on the cell voltage data VD. The cell voltage data VD may include a plurality of cell voltage values. The control unit 140 may determine a minimum cell voltage value minCV among the cell voltage values and determine the first MCCV MCCV1 based on the minimum cell voltage value minCV.

When the minimum cell voltage value minCV is smaller than a first cell voltage threshold value CV1, the control unit 140 may determine the first MCCV MCCV1 as 0 A. In this case, the control unit 140 may block the battery 110 from being charged. When the minimum cell voltage value minCV is greater than a first cell voltage threshold value CV1 and smaller than a second cell voltage threshold value CV2, the control unit 140 may determine the first MCCV MCCV1 as a first value MCCV1a. When the minimum cell voltage value minCV is greater than the second cell voltage threshold value CV2, the control unit 140 may determine the first MCCV MCCV1 as a second value MCCV1b. In the present embodiment, the second value MCCV1b may be a MCCV that may be used to charge the battery pack 100.

The control unit 140 may include first relationship data defining the MCCV with respect to the cell voltage of FIG. 3A, and may determine a MCCV corresponding to the minimum cell voltage value minCV as the first MCCV MCCV1 based on the first relationship data.

As an example, the first cell voltage threshold value CV1 may be 1V, and the second cell voltage threshold value CV2 may be 2V. However, the present invention is not limited to such numeral values, and the numeral values may be changed according to the battery cell 111. As another example, the first value MCCV1a may be 5 A, and the second value MCCV1b may be 20 A. However, the present invention does not limit to such numeral values, and the numeral values may be changed according to the number of the battery cells 111 included in the battery 110 and connection states thereof.

When the minimum cell voltage value minCV fluctuates near the first cell voltage threshold value CV1 or the second cell voltage threshold value CV2, the control unit 140 may determine the first MCCV MCCV1 according to a state in which the minimum cell voltage value minCV is smaller or greater than the first cell voltage threshold value CV1 or according to a state when the second cell voltage threshold value CV2 is maintained during a predetermined (or appropriate) time period (or section) such that the first MCCV MCCV1 does not fluctuate between 0 A and the first value MCCV1a or between the first value MCCV1a and the second value MCCV1b. The predetermined time period may be, for example, 1 second.

For example, even if the minimum cell voltage value minCV is greater than the second cell voltage threshold value CV2, the control unit 140 may not determine the first MCCV MCCV1 as the second value MCCV1b; however, the control unit 140 may determine the first MCCV MCCV1 as the second value MCCV1b if the minimum cell voltage value minCV is maintained to be greater than the second cell voltage threshold value CV2 for at least the predetermined time period.

The graph of FIG. 3A is provided for better understanding of certain features of embodiments of the present invention. Although the minimum cell voltage value minCV range is divided into only three sections in the graph of FIG. 3A, the minimum cell voltage value minCV range may be divided into more or less than three sections.

When the minimum cell voltage value minCV is greater than the second cell voltage threshold value CV2 in the graph of FIG. 3A, the first MCCV MCCV1 is determined as the second value MCCV1b, whereas, when the minimum cell voltage value minCV is greater than a third cell voltage threshold value, which is greater than the second cell voltage threshold value CV2, the first MCCV MCCV1 may be determined as a third value smaller than the second value MCCV1b.

Figure 3B:
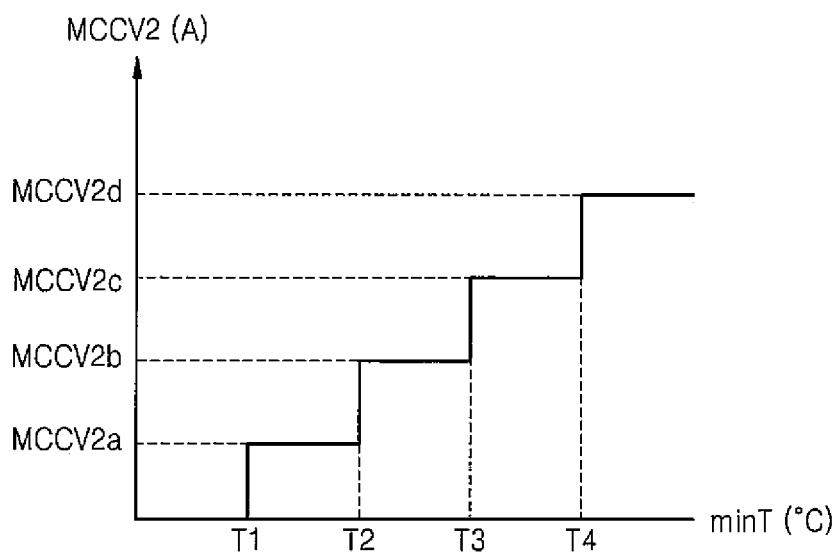
FIG. 3B is an exemplary graph of a MCCV with respect to a temperature according to an embodiment of the present invention.

FIG. 3B is an exemplary graph of a MCCV with respect to a temperature according to an embodiment of the present invention.

Referring to FIG. 3B, the control unit 140 may determine a second MCCV MCCV2 based on the temperature data TD. The temperature data TD may include a plurality of temperature values. The control unit 140 may determine a minimum temperature value minT among the temperature values and determine the second MCCV MCCV2 based on the minimum temperature value minT.

When the minimum temperature value minT is smaller than a first temperature threshold value T1, the control unit 140 may determine the second MCCV MCCV2 as 0 A. In this case, the control unit 140 may block the battery 110 from being charged. When the minimum temperature value minT is greater than the first temperature threshold value T1 and smaller than a second temperature threshold value T2, the control unit 140 may determine the second MCCV MCCV2 as a first value MCCV2a. When the minimum temperature value minT is greater than the second temperature threshold value T2 and smaller than a third temperature threshold value T3, the control unit 140 may determine the second MCCV MCCV2 as a second value MCCV2b. When the minimum temperature value minT is greater than the third temperature threshold value T3 and smaller than a fourth temperature threshold value T4, the control unit 140 may determine the second MCCV MCCV2 as a third value MCCV2c. When the minimum temperature value minT is greater than the fourth temperature threshold value T4, the control unit 140 may determine the second MCCV MCCV2 as a fourth value MCCV2d. In the present embodiment, the fourth value MCCV2d may be a maximum MCCV that may be used to charge the battery pack 100, and may be the same as the second value MCCV1b of FIG. 3A.

The control unit 140 may include second relationship data defining the MCCV with respect to the temperature of FIG. 3B, and may determine a MCCV corresponding to the minimum temperature value minT as the second MCCV MCCV2 based on the second relationship data.

As an example, the first temperature threshold value T1 may be −20° C., the second temperature threshold value T2 may be −10° C., the third temperature threshold value T3 may be 0° C., and the fourth temperature threshold value T4 may be 10° C. However, the present invention does not limit to such numeral values, and the numeral values may be changed according to the battery cell 111. As an example, the first value MCCV2a may be 5 A, the second value MCCV2b may be 10 A, the third value MCCV2c may be 15 A, and the fourth value MCCV2d may be 20 A. However, the present invention does not limit to such numeral values, and the numeral values may be changed according to the number of the battery cells 111 included in the battery 110 and connection states thereof.

Because the minimum temperature value minT may fluctuate near the first through fourth temperature threshold values T1-T4, the control unit 140 may determine the second MCCV MCCV2 according to whether or not the minimum temperature value minT remains within a temperature range between the first through fourth temperature threshold values T1-T4 during a predetermined (or appropriate) time period (or section) such that the second MCCV MCCV2 does not fluctuate. The predetermined time period may be, for example, 1 second.

For example, if the minimum temperature value minT has been fluctuating between the second temperature threshold value T2 and the third temperature threshold value, the control unit 140 may determine the second MCCV MCCV2 as the third value MCCV2c after the minimum temperature value minT is maintained to be greater than the third temperature threshold value T3 for at least the predetermined time period.

The graph of FIG. 3B is provided for better understanding. Although the minimum temperature value minT range is divided into five sections in the graph of FIG. 3B, the minimum temperature value minT range may be divided into sections more or less than five. When the minimum temperature value minT is greater than the fourth temperature threshold value T4 in the graph of FIG. 3B, the second MCCV MCCV2 is determined as the fourth value MCCV2d, whereas, when the minimum temperature value minT is greater than a fifth temperature threshold value, which is greater than the fourth temperature threshold value T4, the second MCCV MCCV2 may be determined as a fifth value smaller than the fourth value MCCV2d.

The control unit 140 may determine the first MCCV MCCV1 based on the cell voltage data VD by using the first relationship data, and the second MCCV MCCV2 based on the temperature data TD by using the second relationship data. The control unit 140 may determine a smaller one between the first MCCV MCCV1 and the second MCCV MCCV2 as the MCCV.

The control unit 140 may be programmed by using the first relationship data and the second relationship data as follows (for example, as shown in Algorithm 1, below). It may be assumed that the first value MCCV1a with respect to the minimum cell voltage minCV and the second value MCCV1b with respect to the minimum temperature minT are the same, and the second value MCCV1b with respect to the minimum cell voltage minCV and the fourth value MCCV1d with respect to the minimum temperature minT are the same.

---

Algorithm 1:

---

If (minCV < CV1 or minT < T1) then MCCV = 0;
else if (minCV < CV2 or minT < T2) then MCCV = MCCV1a;
else if (minT < T3) then MCCV = MCCV2b;
else if (minT < T4) then MCCV = MCCV2c;
else MCCV = MCCV2d.

---

Figure 4A:
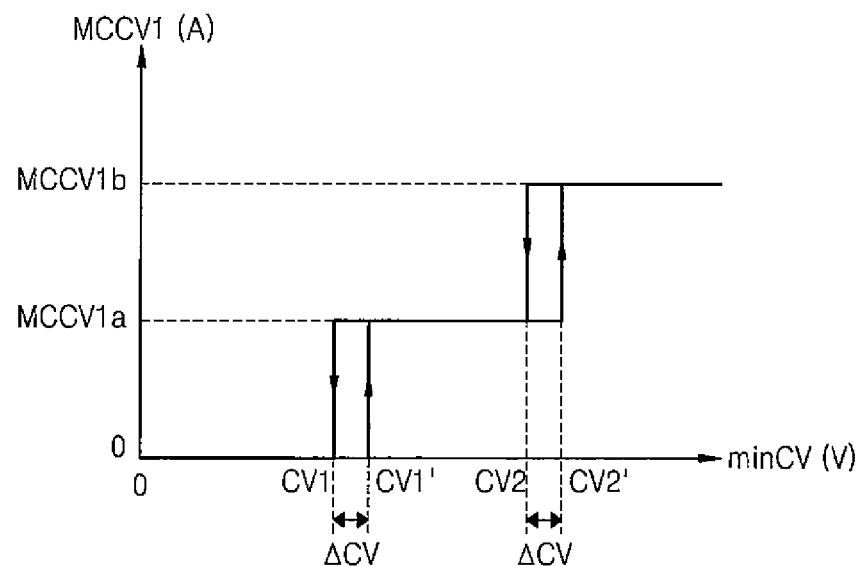
FIG. 4A is an exemplary graph of a MCCV with respect to a cell voltage according to another embodiment of the present invention.

FIG. 4A is an exemplary graph of a MCCV with respect to a cell voltage according to another embodiment of the present invention.

Referring to FIG. 4A, the graph of FIG. 4A is the similar to the graph of FIG. 3A except that the graph of FIG. 4A includes hysteresis sections. The control unit 140 may be configured to operate in a similar manner as described with reference to FIG. 3A above. Differences between FIGS. 3A and 4A are described below. A case where the minimum cell voltage value minCV is near the first cell voltage threshold value CV1 is described below.

When the minimum cell voltage value minCV is smaller than the first cell voltage threshold value CV1, the control unit 140 may determine the first MCCV MCCV1 as 0 A. When the minimum cell voltage value minCV is greater than the first cell voltage threshold value CV1, the control unit 140 may maintain the first MCCV MCCV1 as 0 A. When the minimum cell voltage value minCV is greater than a third cell voltage threshold value CV1' that is greater than the first cell voltage threshold value CV1 by a predetermined (or appropriate) hysteresis margin ΔCV, the control unit 140 may determine the first MCCV MCCV1 as the first value MCCV1a. Even when the minimum cell voltage value minCV is smaller than the third cell voltage threshold value CV1', the control unit 140 may maintain the first MCCV MCCV1 as the first value MCCV1a. When the minimum cell voltage value minCV is smaller than the first cell voltage threshold value CV1, the control unit 140 may determine the first MCCV MCCV1 as 0 A. That is, when the minimum cell voltage value minCV is greater than the first cell voltage threshold value CV1 and smaller than the third cell voltage threshold value CV1', the control unit 140 may be configured to determine 0 A or the first value MCCV1a as the first MCCV MCCV1 according to whether the minimum cell voltage value minCV is increasing or decreasing. The predetermined hysteresis margin ΔCV may be, for example, 0.1V.

As another example, the control unit 140 may change the first MCCV MCCV1 when the minimum cell voltage value minCV is maintained during a predetermined (or appropriate) time period (or section). That is, when the minimum cell voltage value minCV is maintained to be greater than the third cell voltage threshold value CV1' for the predetermined time period, the control unit 140 may determine the first MCCV MCCV1 as the first value MCCV1a. When the minimum cell voltage value minCV is maintained to be greater than the first cell voltage threshold value CV1 for the predetermined time period, the control unit 140 may determine the first MCCV MCCV1 as 0 A. For example, when the minimum cell voltage value minCV is maintained to be greater than the first cell voltage threshold value CV1 and smaller than the third cell voltage threshold value CV1' during the predetermined time period, the control unit 140 may be configured to determine 0 A or the first value MCCV1a as the first MCCV MCCV1 according to whether the minimum cell voltage value minCV is increasing or decreasing.

The minimum cell voltage value minCV may fluctuate near the first cell voltage threshold value CV1, however the control unit prevents the first MCCV MCCV1 from fluctuating.

The minimum cell voltage value minCV may fluctuate near the second cell voltage threshold value CV2. A fourth cell voltage threshold value CV2' may be determined as a value greater than the second cell voltage threshold value CV2 according to the predetermined hysteresis margin ΔCV.

Figure 4B:
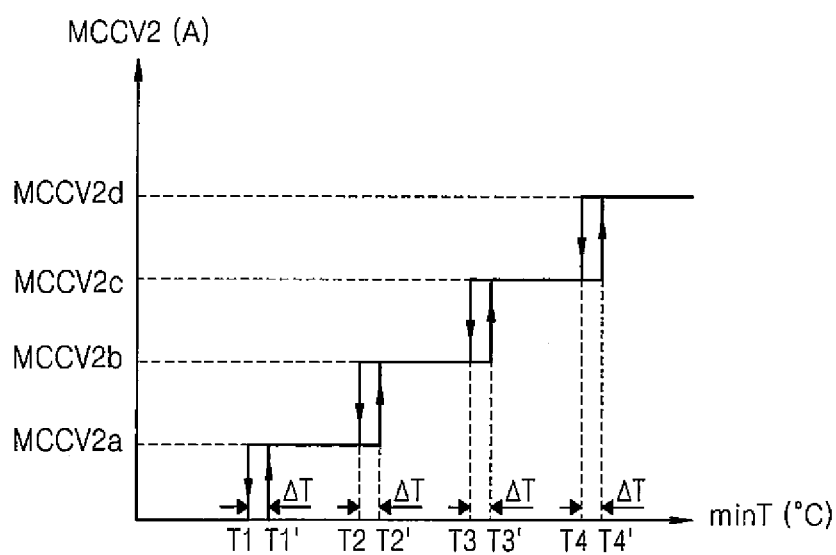
FIG. 4B is an exemplary graph of a MCCV with respect to a temperature according to another embodiment of the present invention.

FIG. 4B is an exemplary graph of a MCCV with respect to a temperature according to another embodiment of the present invention.

Referring to FIG. 4B, the graph of FIG. 4B is similar to the graph of FIG. 3B except that the graph of FIG. 4B includes a hysteresis section. The control unit 140 may be configured to operate in a similar manner as described with reference to FIG. 3B above. Differences between FIGS. 3B and 4B are described below. A case where the minimum temperature value minT is near the fourth temperature threshold value T4 is described below.

When the minimum temperature value minT is smaller than the fourth temperature threshold value T4, the control unit 140 may determine the second MCCV MCCV2 as the third value MCCV2c. When the minimum temperature value minT is greater than the fourth temperature threshold value T4, the control unit 140 may maintain the second MCCV MCCV2 as third value MCCV2c. When the minimum temperature value minT is greater than an eighth temperature threshold value T4' that is greater than the fourth temperature threshold value T4 by a predetermined (or appropriate) hysteresis margin $\Delta T$, the control unit 140 may determine the second MCCV MCCV2 as the fourth value MCCV2d. Even when the minimum temperature value minT is smaller than the eighth temperature threshold value T4', the control unit 140 may maintain the second MCCV MCCV2 as the fourth value MCCV2d. When the minimum temperature value mini is smaller than the eighth temperature threshold value T4', the control unit 140 may determine the second MCCV MCCV2 as the third value MCCV2c. That is, when the minimum temperature value minT is greater than the fourth temperature threshold value T4 and smaller than the eighth temperature threshold value T4', the control unit 140 may be configured to determine the third value MCCV2c or the fourth value MCCV2d as the second MCCV MCCV2 according to whether the minimum temperature value minT is increasing or decreasing. The predetermined hysteresis margin $\Delta T$ may be, for example, 0.1V.

As another example, the control unit 140 may change the second MCCV MCCV2 when the minimum temperature value minT is maintained during a predetermined (or appropriate) time period (or section). That is, when the minimum temperature value minT is maintained to be greater than the eighth temperature threshold value T4' during the predetermined time period, the control unit 140 may determine the second MCCV MCCV2 as the fourth value MCCV2d. When the minimum temperature value minT is maintained to be smaller than the fourth temperature threshold value T4 during the predetermined time period, the control unit 140 may determine the second MCCV MCCV2 as the third value MCCV2c. That is, when the minimum temperature value minT is maintained to be greater than the fourth temperature threshold value T4 and smaller than the eighth temperature threshold value T4' during the predetermined time period, the control unit 140 may be configured to determine the third value MCCV2c or the fourth value MCCV2d as the second MCCV MCCV2 according to whether the minimum temperature value minT is increasing or decreasing.

The minimum temperature value minT may fluctuate near the fourth temperature threshold value T4; however the control unit 140 prevents the second MCCV MCCV2 from fluctuating.

This also applies to a case where the minimum temperature value minT fluctuates near the first temperature threshold value T1, the temperature threshold value T2, or the third temperature threshold value T3. A fifth temperature threshold value T1' may be determined as a value greater than the first temperature threshold value T1 by the hysteresis margin $\Delta T$. A sixth temperature threshold value T2' may be determined as a value greater than the second temperature threshold value T2 by the hysteresis margin $\Delta T$. A seventh temperature threshold value T3' may be determined as a value greater than the third temperature threshold value T3 by the hysteresis margin $\Delta T$.

The control unit 140 may determine the first MCCV MCCV1 based on the cell voltage data VD by using first relationship data regarding the minimum cell voltage minCV and the first MCCV MCCV1 that are provided by the graph of FIG. 4A, and the second MCCV MCCV2 based on the temperature data TD by using second relationship data regarding the minimum temperature value minT and the second MCCV MCCV2 that are provided by the graph of FIG. 4B. The control unit 140 may determine a smaller one between the first MCCV MCCV1 and the second MCCV MCCV2 as the MCCV.

FIGS. 5A through 5C are exemplary tables of MCCVs with respect to a cell voltage and a temperature based on the graphs of FIGS. 4A and 4B. FIG. 5A shows the MCCV with respect to an initial cell voltage and an initial temperature. FIG. 5B shows an example of the MCCV with respect to a cell voltage and a temperature. FIG. 5C shows another example of the MCCV with respect to a cell voltage and a temperature. Referring to FIGS. 5A through 5C, it is assumed that the first value MCCV1a with respect to the minimum cell voltage minCV and the second value MCCV1b with respect to the minimum temperature minT are the same, and the second value MCCV1b with respect to the minimum cell voltage minCV and the fourth value MCCV1d with respect to the minimum temperature minT are the same.

Referring to FIG. 5A, when the control unit 140 receives the cell voltage data VD and the temperature data TD for the first time, the control unit 140 determines the minimum cell voltage minCV among cell voltage values of the cell voltage data VD, and determines the minimum temperature minT as temperature values of the temperature data TD. The control unit 140 may determine the MCCV corresponding to the minimum cell voltage minCV and the minimum temperature minT based on the table of FIG. 5A.

Referring to FIG. 5B, different conditions are provided according to whether the minimum cell voltage minCV and the minimum temperature minT is increasing or decreasing. The control unit 140 may determine the MCCV corresponding to the minimum cell voltage minCV and the minimum temperature minT based on the table of FIG. 5B.

Referring to FIG. 5C, an additional condition that the MCCV is changed when the minimum cell voltage minCV or the minimum temperature minT is maintained within a new section during a predetermined time period tp is added. When the minimum cell voltage minCV or the minimum temperature minT is changed to be within a new section and they are maintained within the new section during the predetermined time period tp, the control unit 140 may determine the MCCV corresponding to the new section.

Figure 6:
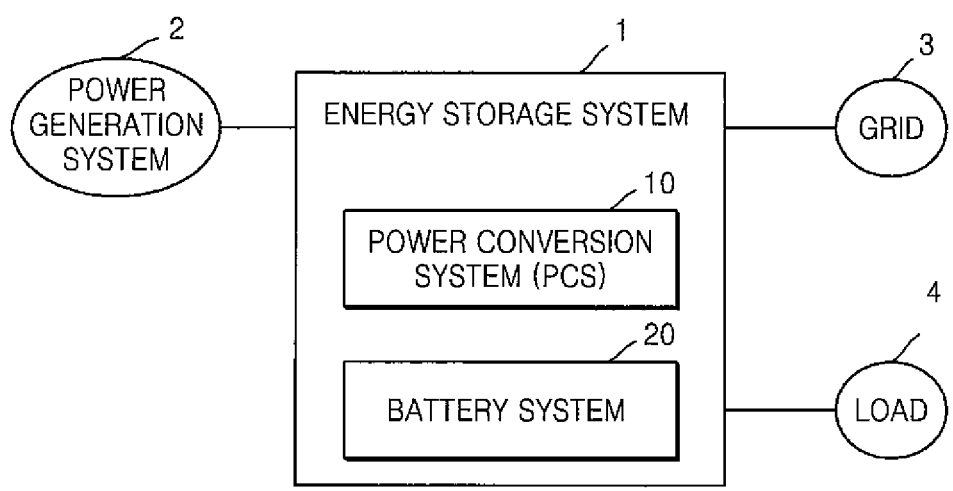
FIG. 6 is a schematic block diagram of an energy storage system and its peripheral configuration according to an embodiment of the present invention.

FIG. 6 is a schematic block diagram of an energy storage system 1 and its peripheral configuration according to an embodiment of the present invention.

Referring to FIG. 6, the energy storage system 1 is used with a power generation system 2 and a grid 3 to supply power to a load 4. The energy storage system 1 includes a battery system 20 that stores power and a power conversion system (PCS) 10. The PCS 10 may convert power supplied from the power generation system 2, the grid 3, and/or the battery system 20 into an appropriate type of power and supplies the appropriate type of power to the load 4, the battery system 20, and/or the grid 3.

The power generation system 2 is a system that generates power by using an energy source. The power generation system 2 generates power and supplies the power to the energy storage system 1. The power generation system 2 may include at least one of a solar power generation system, a wind power generation system, and a tidal power generation system. For example, the power generation system 2 may include any power generation system that may generate power by using renewable energy such as solar heat or geothermal heat. The power generation system 2 may act as a high-capacity energy system by arranging a plurality of power generation modules for generating power in parallel.

The grid 3 may include a power plant, a substation, power lines, etc. If the grid 3 is in a normal state, the grid 3 may supply power to the load 4 and/or the battery system 20, or may receive power from the battery system 20 and/or the power generation system 2. If the grid 3 is in an abnormal state, power supply between the grid 3 and the energy storage system 1 is stopped.

The load 4 may consume power generated by the power generation system 2, power stored in the battery system 20, and/or power supplied from the grid 3. Electric devices used in houses or factories may be an example of the load 4.

The energy storage system 1 may store power generated by the power generation system 2 in the battery system 20, or supply the generated power to the grid 3. The energy storage system 1 may supply power stored in the battery system 20 to the grid 3, or may store power supplied from the grid 3 in the battery system 20. When the grid 3 is in an abnormal state, for example, when there is a power failure in the grid 3, the energy storage system 1 may supply power generated by the power generation system 2 or power stored in the battery system 20 to the load 4 by performing an uninterruptible power supply (UPS) operation.

Figure 7:
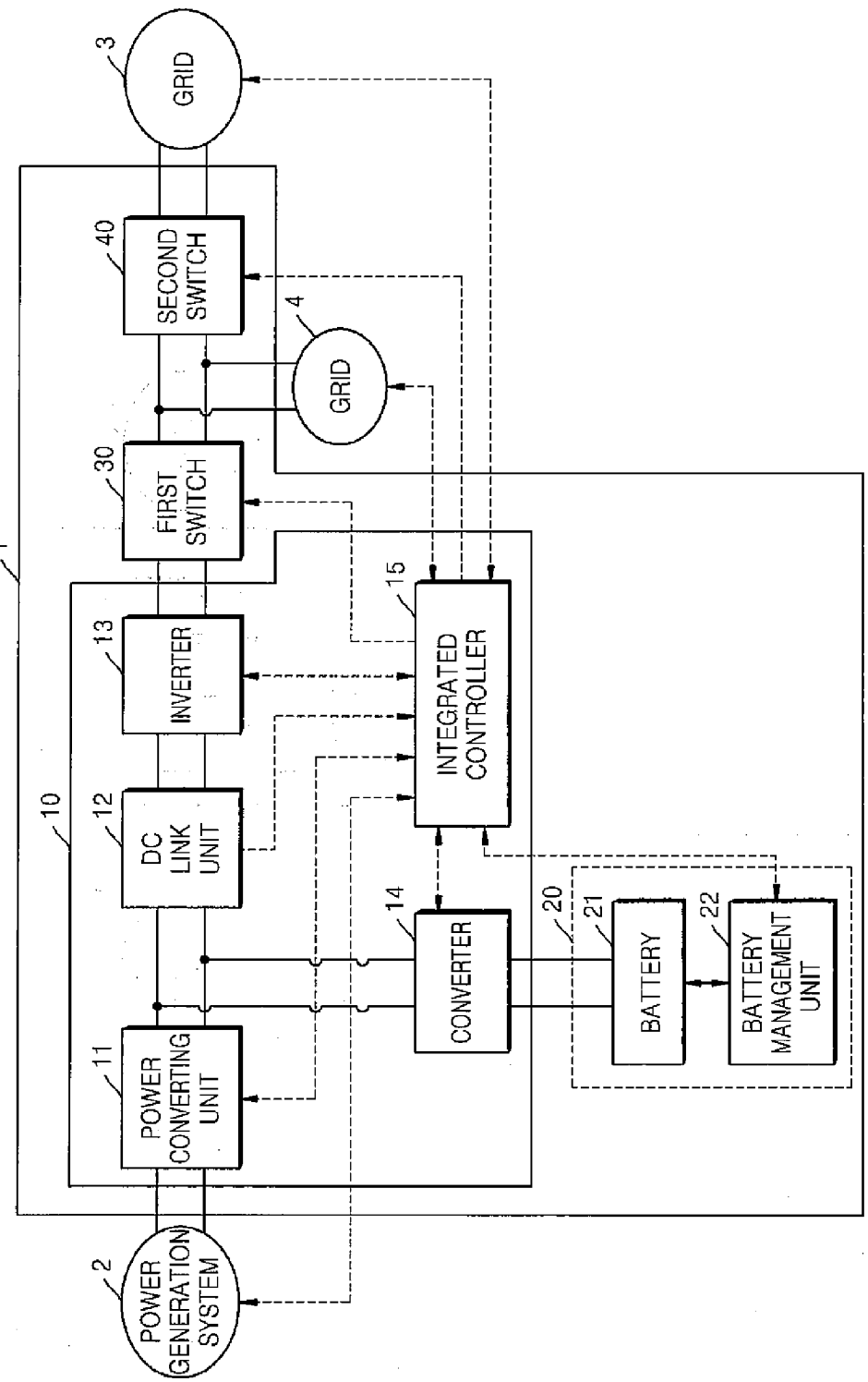
FIG. 7 is a schematic block diagram of an energy storage system according to an embodiment of the present invention.

FIG. 7 is a schematic block diagram of the energy storage system 1 according to an embodiment of the present invention.

Referring to FIG. 7, the energy storage system 1 may include the PCS 10 that converts power, the battery system 20, a first switch 30, and a second switch 40. The battery system 20 may include a battery 21 and a battery management unit 22.

The PCS 10 may convert power supplied from the power generation system 2, the grid 3, and/or the battery system 20 into an appropriate type of power and supplies the appropriate type of power to the load 4, the battery system 20 and/or the grid 3. The PCS 10 may include a power converting unit 11, a direct current (DC) link unit 12, an inverter 13, a converter 14, and an integrated controller 15.

The power converting unit 11 may be connected between the power generation system 2 and the DC link unit 12. The power converting unit 11 may convert power generated by the power generation system 2 into a DC link voltage and may apply the DC link voltage to the DC link unit 12. The power converting unit 11 may include a power conversion circuit, such as a converter circuit or a rectifier circuit, according to a type of the power generation system 2. When the power generation system 2 generates DC power, the power converting unit 11 may include a DC-DC converter circuit for converting DC power generated by the power generation system 2 into other DC power. On the contrary, when the power generation system 2 generates alternating current (AC) power, the power converting unit 11 may include a rectifier circuit for converting the AC power into DC power.

When the power generation system 2 is a solar power generation system, the power converting unit 11 may include a maximum power point tracking (MPPT) converter that performs a MPPT control, so as to obtain maximum power output from the power generation system 2 according to a change in solar radiation, temperature, etc. When the power generation system 2 generates no power, the power converting unit 11 may stop operating, thereby minimizing power consumed by a power converter such as a converter circuit or a rectifier circuit included in the power converting unit 11.

A level of the DC link voltage may become unstable due to an instantaneous voltage drop in the power generation system 2 or the grid 3 or a peak load in the load 4. However, the DC link voltage needs to be stabilized to normally operate the inverter 13 and the converter 14. The DC link unit 12 may be connected between the power converting unit 11 and the inverter 13 and may maintain the DC link voltage to be constant or substantially constant. The DC link unit 12 may include, for example, a mass storage capacitor.

The inverter 13 may be a power converter connected between the DC link unit 12 and the first switch 30. The inverter 13 may include an inverter that converts the DC link voltage output from at least one of the power generation system 2 and the battery system 20 into an AC voltage of the grid 3 and outputs the AC voltage. Also, the inverter 13 may include a rectifier circuit that rectifies an AC voltage output from the grid 3 into the DC link voltage to be stored in the battery system 20 in a charging mode. The inverter 13 may be a bidirectional inverter in which input and output directions may be changed.

The inverter 13 may include a filter for removing harmonics from the AC voltage output from the grid 3, and a phase-locked loop (PLL) circuit for matching a phase of the AC voltage output from the inverter 13 to a phase of the AC voltage of the grid 3 in order to prevent generation of reactive power. Also, the inverter 13 may perform other functions such as restriction of a voltage variation range, power factor correction, removal of DC components, and protection or reduction from or of transient phenomena.

The converter 14 (or power converting apparatus) may be a power converter connected between the DC link unit 12 and the battery system 20. The converter 14 may include a DC-DC converter that converts DC power stored in the battery system 20 into a DC link voltage of an appropriate level and outputs the DC link voltage to the inverter 13 via the DC link unit 12 in a discharging mode. Also, the converter 14 includes a DC-DC converter that converts DC power output from the power converting unit 11 or the inverter 13 into DC power of an appropriate voltage level, that is, a charge voltage level required by the battery system 20, and supplies the DC power to the battery system 20 in a charging mode. The converter 14 may be a bidirectional converter in which input and output directions may be changed. When the battery system 20 is not charging or discharging, the operation of the converter 14 may be stopped, thereby minimizing or reducing power consumption.

The integrated controller 15 may monitor states of the power generation system 2, the grid 3, the battery system 20, and the load 4. For example, the integrated controller 15 may monitor whether a power failure occurs in the grid 3, whether the power generation system 2 generates power, the amount of power generated by the power generation system 2, a charge state of the battery system 20, the amount of power consumed by the load 4, time, etc.

The integrated controller 15 may control operations of the power converting unit 11, the inverter 13, the converter 14, the battery system 20, the first switch 30, and the second switch 40 according to a preset algorithm or results of the monitoring. For example, when a power failure occurs in the grid 3, the integrated controller 15 may control power stored in the battery system 20 or power generated by the power generation system 2 to be supplied to the grid 3. Also, when a sufficient amount of power may not be supplied to the load 4, the integrated controller 15 may control the load 4 to determine priorities for devices which use power included in the load 4 and supply power to the devices which use power having high priorities. Also, the integrated controller 15 may control the battery system 20 to be charged and discharged.

The first switch 30 and the second switch 40 are connected in series between the inverter 13 and the grid 3, and control the flow of current between the power generation system 2 and the grid 3 by being turned on or off under the control of the integrated controller 15. The first switch 30 and the second switch 40 may be turned on or off according to states of the power generation system 2, the grid 3, and the battery system 20. More specifically, when power of at least one of the power generation system 2 and the battery system 20 is supplied to the load 4 or power of the grid 3 is supplied to the battery system 20, the first switch 30 is turned on. When power of at least one of the power generation system 2 and the battery system 20 is supplied to the grid 3 or power of the grid 3 is supplied to at least one of the load 4 and the battery system 20, the second switch 40 is turned on.

When a power failure occurs in the grid 3, the second switch 40 is turned off and the first switch 30 is turned on. That is, power from at least one of the power generation system 2 and the battery system 20 is supplied to the load 4 and power supplied to the load 4 is prevented from flowing toward the grid 3. As such, because the energy storage system 1 operates as a stand-alone-system, a worker who works at a power distribution line of the grid 3 or the like may be prevented from getting an electric shock due to power output from the power generation system 2 or the battery system 20.

Each of the first switch 30 and the second switch 40 may include a switching device such as a relay which may endure or process a large amount of current.

The battery system 20 may receive and store power supplied from at least one of the power generation system 2 and the grid 3, and may supply stored power to at least one of the load 4 and the grid 3. The battery system 20 may correspond to the battery packs 100 and 100a described with reference to FIGS. 1 and 2 above. The battery system 20 may include the battery packs 100 and 100a.

The battery system 20 may include the battery 21 including at least one battery cell and the battery management unit 22 that controls and protects the battery 21 to store power. The battery management unit 22 may be connected to the battery 21 and control an overall operation of the battery system 20 according to a control command or an internal algorithm from the integrated controller 15. For example, the battery management unit 22 may perform overcharge protection, over-discharge protection, over-current protection, overvoltage protection, overheat protection, and cell balancing.

The battery management unit 22 may obtain voltage of the battery 21, current, temperature, remaining power amount, lifetime, and state of charge (SOC). For example, the battery management unit 22 may measure a cell voltage, current, and temperature of the battery 21 by using sensors. At least one temperate sensor may be disposed in the battery 21 to detect the temperature of the battery 21. The battery management unit 22 may calculate the remaining power amount of the battery 21, lifetime, and SOC based on the measured cell voltage, current, and temperature. The battery management unit 22 may manage the battery 21 based on results of the measuring and calculating and transmit the results of the measuring and calculating to the integrated controller 15. The battery management unit 22 may control charge and discharge operations of the battery 21 according to charge and discharge control commands receive from the integrated controller 15.

The battery management unit 22 may include a cell voltage measuring unit that measures cell voltages of the battery 21 and generates cell voltage data including cell voltage values, a temperature measuring unit that generates temperature data including temperature values corresponding to the temperature of the battery 21 from the temperature sensors disposed in the battery 21, and a control unit configured to determine a MCCV of current flowing into the battery 21 based on the cell voltage data and the temperature data. The battery management unit 22 may transmit the MCCV to the integrated controller 15. The integrated controller 15 may receive the MCCV and control the converter 14 to supply current having a value below the MCCV to the battery 21.

As another example, the battery management unit 22 may receive the cell voltage data from the cell voltage measuring unit and receive the temperature data from the temperature measuring unit. The battery management unit 22 may transmit the cell voltage data and the temperature data to the integrated controller 15. The integrated controller 15 may determine a MCCV of current that are to be supplied to the battery 21 based on the cell voltage data and the temperature data. The integrated controller 15 may control the converter 14 to supply current having a value below the MCCV to the battery 21.

Figure 8:
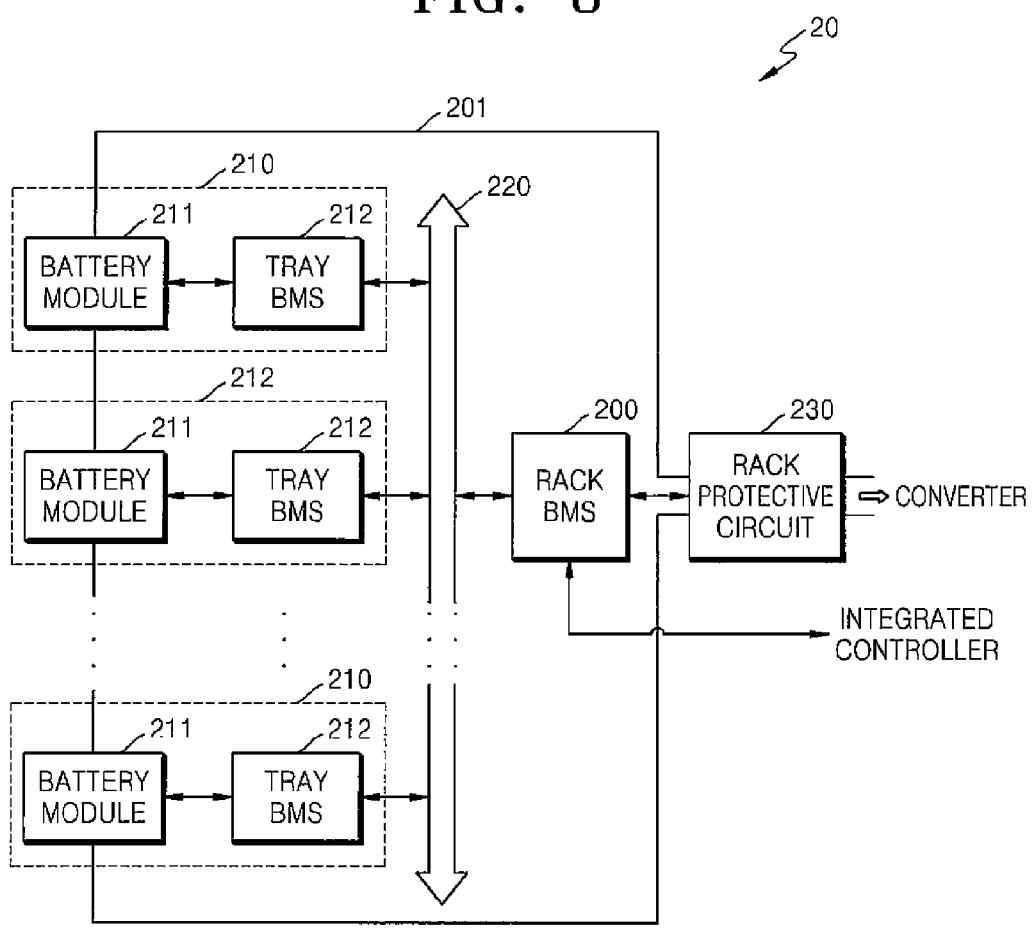
FIG. 8 is a block diagram of a battery system according to an embodiment of the present invention.

FIG. 8 is a block diagram of the battery system 20 according to an embodiment of the present invention.

Referring to FIG. 8, the battery system 20 may include a battery rack 201 as a subordinate element. The battery rack 201 may include a tray 210 as a subordinate element.

The battery system 20 may include a rack battery management system (BMS) 200, a plurality of trays 210, a bus line 220, and a rack protective circuit 230.

The trays 210 which are subordinate elements of the battery rack 201 store power, and supply stored power to the grid 3 and/or the load 4. Each of the trays 210 may include battery modules 211 and tray BMSs 212.

The battery modules 211, which store power, may include at least one battery cell. At least one temperature sensor may be disposed in the battery modules 211 to detect temperatures of the battery cells included in the battery modules 211. The tray BMSs 212 control charge and discharge operations of the battery modules 211. The battery modules 211 may be connected in series to generate an output voltage required by the battery system 20. The battery modules 211 may receive power from the converter 14 or supply power to the converter 14 via the rack protective circuit 230.

The tray BMSs 212 control charge and discharge operations of the battery modules 211. The tray BMS 212 may monitor states of the battery modules 211, for example, temperatures of the battery modules 211, cell voltages, charge and discharge current, etc. The tray BMSs 212 may include cell voltage measuring units that measure cell voltages of the battery cells included in the battery modules 211 and generate cell voltage data including cell voltage values, and temperature measuring units that generate temperature data including temperature values corresponding to temperatures of the battery 21 from the temperature sensors disposed in the battery modules 211. The tray BMSs 212 may transmit results of the monitoring to the rack BMS 200. The tray BMSs 212 may transmit the cell voltage data and the temperature data to the rack BMS 200. The tray BMSs 212 may receive a control signal from the rack BMS 200 and perform an operation according to the control signal.

The bus line 220 is a path through which data or a command is transmitted between the rack BMS 200 and the tray BMSs 212. A controller area network (CAN) may be used as a communication protocol between the rack BMS 200 and the tray BMSs 212. However, the present embodiment is not limited thereto, and the bus line 220 may be any communications protocol for transmitting data or a command via a bus line. Although the bus line 220 is used to communicate between the rack BMS 200 and the tray BMSs 212 in the present embodiment, the present embodiment is not limited thereto. For example, the rack BMS 200 may communicate with each of the tray BMSs 212 one-to-one. For another example, serial communications may be performed between the tray BMSs 212. That is, any communications protocol for transmitting data or a command between the rack BMS 200 and the tray BMSs 212 may be used.

The rack BMS 200 controls charge and discharge operations of the battery system 20 by controlling the rack protective circuit 230. The rack BMS 200 may transmit data of the states of the battery modules 211, for example, temperatures, cell voltages, charge and discharge current, etc. that are collected from the tray BMSs 212 to the integrated controller 15. The rack BMS 200 may determine a MCCV based on the cell voltage data and the temperature data and transmit the MCCV to the integrated controller 15. The integrated controller 15 may receive the MCCV and control the converter 14 to supply current having a value below the MCCV to the battery 21.

As another example, the rack BMS 200 may transmit the cell voltage data and the temperature data to the integrated controller 15. The integrated controller 15 may determine a MCCV of current that is to be supplied to the battery 21 based on the cell voltage data and the temperature data. The integrated controller 15 may control the converter 14 to supply current having a value below the MCCV to the battery 21.

The rack BMS 200 may receive and analyze data obtained by monitoring the battery modules 211 from the tray BMSs 212. The rack BMS 200 may transmit a control signal to the tray BMSs 212 based on results of the analyzing. The rack BMS 200 may transmit the data received from the tray BMSs 212 or the results of the analyzing to the integrated controller 15 and transmit the control signal received from the integrated controller 15 to the tray BMSs 212.

The rack protective circuit 230 may cut off power supply under the control of the rack BMS 200. The rack protective circuit 230 measure voltage and current of the battery system 20 and transmit results of the measuring to the integrated controller 15. For example, the rack protective circuit 230 may include a relay or a fuse for cutting off current. The rack protective circuit 230 may include a sensor for measuring voltage and current.

As an example, the rack protective circuit 230 may include a current limiting unit that limits charging current supplied from the converter 14. The rack BMS 200 may determine a MCCV based on the cell voltage data and the temperature data and control the rack protective circuit 230 to pass through current having a value below the MCCV.

A case where the battery system 20 includes only one battery rack 201 is described in the present embodiment. However, this is an example, and the battery system 20 may be configured by connecting a plurality of battery racks 201 in series and parallel according to voltage or capacity required by a consumer. When the battery system 20 includes the plurality of battery racks 201, the battery system 20 may further include a system BMS for controlling the plurality of battery racks 201. The system BMS may determine a MCCV based on the cell voltage data and the temperature data and transmit the MCCV to the integrated controller 15.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A battery pack comprising:
    a battery comprising at least one battery cell;
    at least one temperature sensor configured to detect a temperature of the battery;
    a cell voltage measuring unit configured to measure a cell voltage of the at least one battery cell and to generate cell voltage data comprising at least one cell voltage value;
    a temperature measuring unit coupled to the at least one temperature sensor, the temperature measuring unit being configured to generate temperature data comprising at least one temperature value corresponding to the temperature of the battery detected by the at least one temperature sensor; and
    a control unit configured to:
        determine a maximum charging current value (MCCV) of a charging current for charging the battery based on the cell voltage data and the temperature data;
        transmit the MCCV to a charging apparatus that is configured to supply the charging current to the battery pack, and that is configured to control the charging current supplied to the battery pack to have a value below the MCCV;

determine a minimum cell voltage value or a minimum temperature value among the at least one cell voltage value or the at least one temperature value;

determine a first value as the MCCV when the minimum cell voltage value or the minimum temperature value is smaller than a first cell voltage threshold value or a first temperature threshold value, respectively;

determine a second value that is greater than the first value as the MCCV when the minimum cell voltage value or the minimum temperature value is greater than a second cell voltage threshold value or a second temperature threshold value, respectively; and determine one of the first value or the second value as the MCCV according to whether the minimum cell voltage value or the minimum temperature value is increasing or decreasing when the minimum cell voltage value or the minimum temperature value is greater than the first cell voltage threshold value or the first temperature threshold value and smaller than the second cell voltage threshold value or the second temperature threshold value, respectively.

2. The battery pack of claim 1, wherein the second cell voltage threshold value is greater than the first cell voltage threshold value by a hysteresis margin.

3. The battery pack of claim 1, wherein the second temperature threshold value is greater than the first temperature threshold value by a hysteresis margin.

4. The battery pack of claim 1, wherein the control unit is configured to determine a first MCCV based on the at least one cell voltage value, to determine a second MCCV based on the at least one temperature value, and to determine a smaller one between the first MCCV and the second MCCV as the MCCV.

5. An energy storage system comprising:
a battery system comprising:
a battery comprising at least one battery cell; and a battery management unit configured to control charging and discharging of the battery; and
a power conversion system (PCS) comprising:
a power converting apparatus configured to convert power between a power generation system, a grid, and the battery system; and
an integrated controller configured to control the power converting apparatus,
wherein the battery management unit comprises:
a cell voltage measuring unit configured to measure a cell voltage of the at least one battery cell and to generate cell voltage data comprising at least one cell voltage value;
a temperature measuring unit configured to generate temperature data comprising at least one temperature value corresponding to a temperature of the battery detected by at least one temperature sensor in the battery; and
a control unit configured to:
determine a maximum charging current value (MCCV) of a charging current for charging the battery based on the cell voltage data and the temperature data and to transmit the MCCV to the integrated controller;
determine a minimum cell voltage value or a minimum temperature value among the at least one cell voltage value or the at least one temperature value;
determine a first value as the MCCV when the minimum cell voltage value or the minimum temperature value is smaller than a first cell voltage threshold value or a first temperature threshold value, respectively;
determine a second value that is greater than the first value as the MCCV when the minimum cell voltage value or the minimum temperature value is greater than a second cell voltage threshold value or a second temperature threshold value, respectively; and
determine one of the first value or the second value as the MCCV according to whether the minimum cell voltage value or the minimum temperature value is increasing or decreasing when the minimum cell voltage value or the minimum temperature value is greater than the first cell voltage threshold value or the first temperature threshold value and smaller than the second cell voltage threshold value or the second temperature threshold value, respectively,
wherein the integrated controller is further configured to:
receive the MCCV from the battery management unit; and
control the power converting apparatus to supply the charging current having a value below the MCCV to the battery system.

6. The energy storage system of claim 5, wherein the control unit is configured to determine a first MCCV based on the at least one cell voltage value, to determine a second MCCV based on the at least one temperature value, and to determine a smaller one between the first MCCV and the second MCCV as the MCCV.

7. A method of charging a battery pack comprising a battery comprising at least one battery cell, the method comprising:
measuring a cell voltage of the at least one battery cell;
generating cell voltage data comprising at least one cell voltage value corresponding to the cell voltage;
generating temperature data comprising at least one temperature value corresponding to a temperature of the battery measured by at least one temperature sensor;
determining a maximum charging current value (MCCV) of a charging current for charging the battery based on the cell voltage data and the temperature data by:
determining a minimum cell voltage value or a minimum temperature value among the at least one cell voltage value or the at least one temperature value;
determining a first value as the MCCV when the minimum cell voltage value or the minimum temperature value is smaller than a first cell voltage threshold value or a first temperature threshold value, respectively;
determining a second value that is greater than the first value as the MCCV when the minimum cell voltage value or the minimum temperature value is greater than a second cell voltage threshold value or a second temperature threshold value, respectively; and
determining one of the first value or the second value as the MCCV according to whether the minimum cell voltage value or the minimum temperature value is increasing or decreasing when the minimum cell voltage value or the minimum temperature value is greater than the first cell voltage threshold value or the first temperature threshold value and smaller than the second cell voltage threshold value or the second temperature threshold value, respectively;

transmitting the MCCV to a charging apparatus coupled to the battery pack; and supplying the charging current having a value below the MCCV from the charging apparatus.

8. The method of claim 7, wherein the determining of the MCCV comprises:

determining a first MCCV based on the at least one cell voltage value;

determining a second MCCV based on the at least one temperature value; and determining a smaller one between the first MCCV and the second MCCV as the MCCV.

* * * * *